US006282089B1

(12) United States Patent
Nakanishi et al.

(10) Patent No.: US 6,282,089 B1
(45) Date of Patent: Aug. 28, 2001

(54) PORTABLE COMPUTER COOLING METHOD AND COMPUTER HOLDER

(75) Inventors: Tohru Nakanishi; Toshihiko Nishio, both of Moriyama (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/504,944

(22) Filed: Feb. 16, 2000

(30) Foreign Application Priority Data

Mar. 16, 1999 (JP) .................................................. 11-069849

(51) Int. Cl.[7] ...................................................... H05K 5/00
(52) U.S. Cl. ............................ 361/687; 361/688; 361/689; 361/690; 361/691; 361/692; 361/693; 361/694; 361/695; 361/696; 361/697; 361/698; 361/699; 361/701; 361/702; 361/703; 361/704; 361/707; 361/708; 361/709; 361/710; 361/711
(58) Field of Search .................................. 361/687–699, 361/701–704, 707–711

(56) References Cited

U.S. PATENT DOCUMENTS 5,121,291 * 6/1992 Cope et al. ........................... 361/384
5,694,292 12/1997 Paulsel et al. .
6,073,684 * 6/2000 Fiechter et al. .................. 165/104.33
6,118,654 * 9/2000 Bhatia ................................... 361/687

FOREIGN PATENT DOCUMENTS

| 0 825 515 A1 | 2/1998 | (EP) . |
|---|---|---|
| 1-76623 | 5/1989 | (JP) . |
| 10-262719 | 10/1998 | (JP) . |
| 10-275034 | 10/1998 | (JP) . |
| 10-290709 | 11/1998 | (JP) . |
| 2000-259577 | 9/2000 | (JP) . |
| WO99/47988 A2 | 9/1999 | (WO) . |

* cited by examiner

Primary Examiner—Leo P. Picard
Assistant Examiner—Yean-Hsi Chang
(74) Attorney, Agent, or Firm—Marian Underweiser, Esq; McGinn & Gibb, PLLC

(57) ABSTRACT

A method (and structure) for cooling a portable computer includes attaching a portable computer to a holder, transferring heat of a heat-generating component disposed within the portable computer to the holder, and releasing the transferred heat to the atmosphere. The portable computer includes a fixture for detachably fixing the portable computer to the holder, a heat release device for releasing heat of a heat-generating component disposed within the portable computer to the outside, and a supporter which supports the fixture and the heat release device.

20 Claims, 6 Drawing Sheets

PORTABLE COMPUTER COOLING METHOD AND COMPUTER HOLDER

BACKGROUND OF THE INVENTION

1. Field of the Invention

The present invention generally relates to a cooling method and a holder for a portable computer.

2. Description of the Related Art

Portable computers are now being developed which can be used as terminals for desktop computers and the like, adapted to be attached to a belt or a strap, and operative with the use of a microphone and earphone. Internal components employed for such portable computers may have a generated heat density equal to or greater than that of currently available notebook computers. If the heat density of the portable computer is such, conventional design concepts for a cooling device cannot be applied to the portable computer as discussed below.

That is, a portable computer should have a far smaller housing size than a notebook or larger-scale computer. Therefore, with a much smaller housing size, it is difficult to provide sufficient space in the portable computer for installation of a cooling device for cooling the heatgenerating electronic components of the computer.

Further, as the portable computer is basically battery-driven (e.g., on a default operation basis), driving the cooling device increases power consumption, thereby shortening the continuous operation period of the portable computer.

SUMMARY OF THE INVENTION

In view of the foregoing and other problems, disadvantages, and drawbacks of conventional portable computers, the present invention has been devised, and it is an object of the present invention to provide a structure that properly cools a portable computer provided with no internal cooling device.

Further, it is an object of the invention to cool heat-generating electronic components provided in the portable computer so that a central processing unit (CPU) or micro-processing unit (MPU) of the highest processing speed can be used, thereby improving the performance of the portable computer.

It is another object of the present invention to cool the portable computer without influencing the period of continuous operation of the portable computer.

A method of cooling a portable computer according to a first aspect of the present invention includes attaching a portable computer to a holder, transferring heat from a heat-generating component disposed within the portable computer to the holder, and releasing the transferred heat to the atmosphere.

A portable computer cooling method according to another aspect of the present invention includes attaching a portable computer to a holder and cooling a heat-generating component disposed within the portable computer by applying an air blow or an air suction to the heat-generating component from the holder.

In either of the cooling methods, the portable computer is attached to the holder so that the heat-generating component in the portable computer can be cooled by transferring the heat of the heat-generating component to the holder and/or applying an air flow thereto through either an air blow or an air suction.

In another aspect, a computer holder according to the present invention includes a fixture for detachably fixing a portable computer to the holder, a heat-releasing unit for releasing heat from a heat-generating component disposed within the portable computer to the outside, and a supporter which supports the fixture and the heat-releasing unit.

Hence, the portable computer can be fixed to the holder by the fixture when the computer is to be used, and can be detached from the holder when the computer is not in use or data is to be exchanged between the portable computer and a host computer. Further, the heat generated by the heat-generating component during the operation of the portable computer can be released or dissipated outside the computer by the heat-releasing unit.

The present disclosure relates to subject matter contained in Japanese Patent Application 11-069849, filed Mar. 16, 1999, which is expressly incorporated herein by reference in its entirety.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 1:
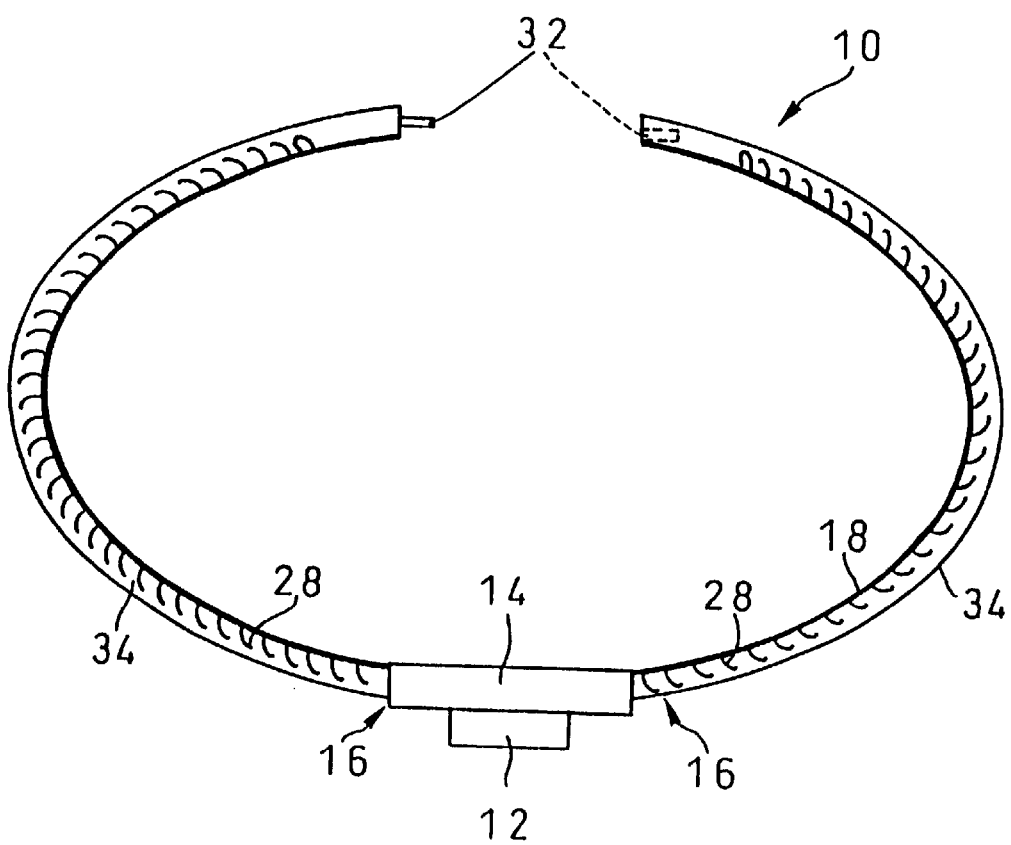
FIG. 1 illustrates a first embodiment of a computer holder according to the present invention.

Referring now to the drawings, and more particularly to FIG. 1–9, there are shown preferred embodiments of the portable computer cooling method and the computer holder according to the present invention.

First Embodiment

As shown in FIG. 1, a computer holder 10 includes a fixture 14 for detachably fixing a portable computer 12 to the holder, a heat-releasing device 16 for releasing heat of a heat-generating component disposed within the portable computer 12 to the outside, and a supporter 18 which supports the fixture 14 and the heat-releasing device 16.

The portable computer 12 can be connected to a host computer such as a desktop computer or a notebook computer for mutual data input and output therebetween. Direct input to and output from the portable computer 12 are mainly achieved through voice communications with the use of a microphone and an earphone and, as required, through switch input and pen input. This type of input reduces keying (e.g., key pad) operations which otherwise may require a large operation area, and allows the portable computer to be configured as compactly as possible.

Neither a cooling device nor a power source for energizing the cooling device are incorporated in the portable computer 12. Thus, the continuous operation period of the computer 12 is extended, and the size of the computer 12 is minimized. Incorporated in the portable computer 12 is a CPU or MPU of the highest processing speed to improve the processing performance and the speed of the computer 12.

Components, such as the CPU used in the portable computer 12, generate heat, and are therefore subjected to high temperature during operation. Unless such heat-generating components are properly cooled, a malfunction and/or reduction in operation speed may occur.

Figure 2:
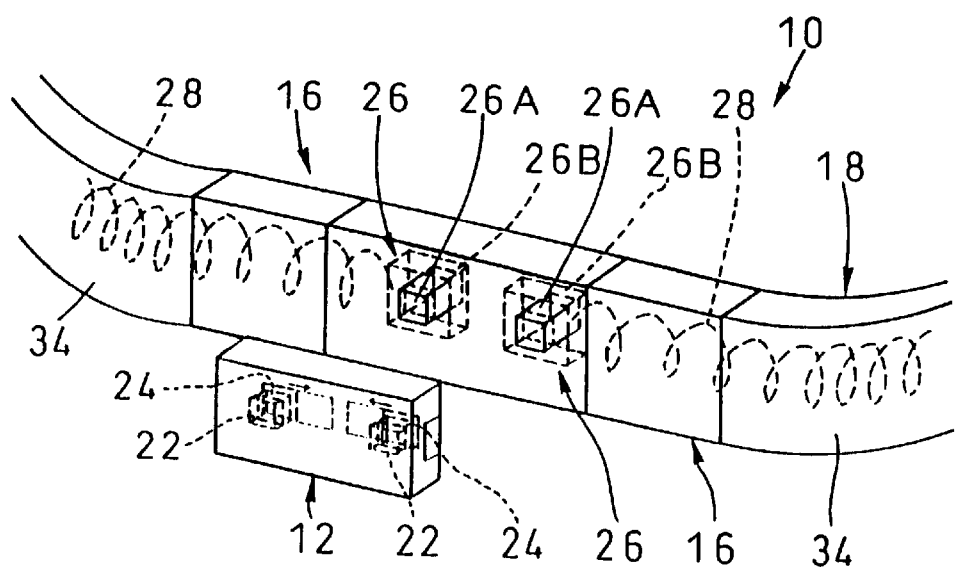
FIG. 2 is a perspective view illustrating major portions of the computer holder shown in FIG. 1.
Figure 3:
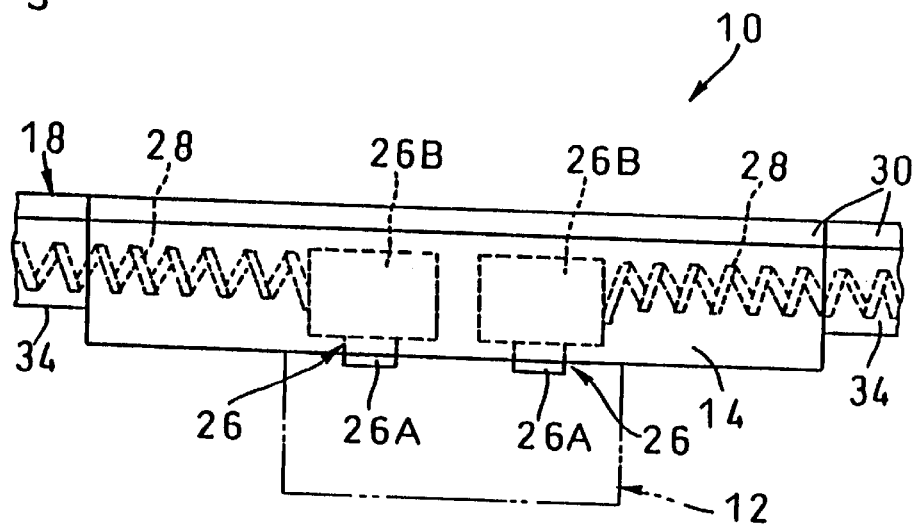
FIG. 3 is a plan view illustrating major portions of the computer holder shown in FIG. 1.

For this reason, as shown in FIGS. 2 and 3, heat conductors 22 are provided in contact with the respective heat-generating components 20 in the portable computer 12. The heat conductors 22 protect the components 20 and reduce the temperature of the components 20. The heat conductors 22 are formed of a highly heat conductive material such as copper or aluminum.

A conventional technique is employed to conduct heat from the components 20 to the heat conductors 22. Preferably, the components 20 are kept in contact with the heat conductors 22, or that a highly heat conductive adhesive agent or resin, including metal particles, for example, is interposed between the components 20 and the heat conductors 22. The portable computer 12 is formed with windows 24 for exposing surfaces of the heat conductors 22 to the outside. This permits the heat of the components 20 to be transferred externally through the heat conductors 22 and the windows 24.

Preferably, shutters are provided on the windows 24 of the portable computer 12 to prevent dust and the like from entering into the portable computer 12 through the windows 24 when the portable computer 12 is detached from the holder 10.

Further, the computer holder 10 includes a fixture 14 which permits the portable computer 12 to be attached or detached from the holder 10. The fixture 14 may include a conventional mechanism, such as a latch, to detachably attach the computer 12 to the holder 10, but is not limited thereto. It is preferable to use a fixture which enables the portable computer 10 to be easily attached and detached with a single motion, if possible.

Heat absorbers 26 are provided in positions corresponding to the heat conductors 22 of the portable computer 12 within a portion of the fixture 14 to which the portable computer 12 is attached. The heat absorbers 26 are kept in contact with the heat conductors 22 and are adapted to transfer the heat of the components 20 through the heat conductors 22 to the outside by heat conduction. The heat absorbers 26 are brought into direct contact with the heat conductors 22, and each has a heat absorbing portion 26A composed of a highly thermally conductive material and a heat sink 26B which accumulates the heat absorbed through the heat absorbing portion 26A.

When the heat absorbing portion 26A and the heat sink 26B are integrally formed, the heat absorber 26 is preferably biased by a spring or the like in such a direction that the heat absorber 26 projects slightly from the fixture 14. In this case, it is preferable that the heat absorber 26 is totally composed of a highly thermal conductive material such as copper, aluminum or an iron alloy. The heat absorber 26 may contain a liquid such as water which has a high heat capacity.

In another aspect, where the heat absorbing portion 26A and the heat sink 26B are formed as separate members, the portion 26A is preferably biased by a spring or the like in such a direction that the portion 26A slightly projects from the heat sink 26B. In this aspect, it is preferable that portion 26A is composed of a highly thermal conductive material such as copper, and the heat sink 26B is composed of a material, such as iron, having a high heat capacity, or a sealed hollow member containing a liquid, such as water, having a high heat capacity. The heat absorbing portion 26A should be kept in intimate contact with the heat sink 26B.

If the heat capacity of the heat sink 26B is sufficiently higher than the amount of heat generated from the component 20 or if the heat capacity of the heat sink 26B is sufficiently high in consideration of the desired continuous operation period of the portable computer 12, no heat-releasing means other than the heat sink 26B will be required. However, if the heat sink 26B alone does not suffice, a heat pipe 28 can be attached to the heat sink 26B.

The heat pipe 28 is a sealed metal pipe with a capillary material and a small amount of a volatile liquid contained therein. In the heat pipe 28, when the liquid is vaporized at a first end of the pipe, cooling occurs at a second end when the resulting vapor is introduced to the second end of the pipe and allowed to release heat for liquefaction. The resulting liquid is absorbed by the capillary material and transferred back to the one end of the pipe for circulation. The heat pipe 28 is not limited to a particular type, and any conventional heat pipe can be used.

The dimensions (e.g., diameter or outer diameter, length, etc.) and the sectional configuration of the heat pipe 28 are determined in accordance with the heat quantity generated from the component 20. The heat pipe 28 has virtually no flexibility. Therefore, if the heat pipe 28 is required to have flexibility so as to be attached to a belt-shaped supporter 18, the heat pipe 28 is formed into a coil shape as shown in FIGS. 1 to 3. The coiling of the heat pipe 28 provides a greater heat-releasing area, and makes it possible to shorten the overall length of a heat pipe installation space. The heat pipe 28 may be provided either on one side or on both sides as shown in the figures. The coil of the heat pipe may have any shape, including a circular, oval or rectangular shape.

The heat pipe 28 and the fixture 14 are fixed to the belt-shaped supporter 18. The supporter 18 is designed for example to be wound around the waist of a user's body. The supporter 18 should be strong enough not to be easily torn and be flexible enough not to damage the human body. In addition, a heat insulator 30 is provided on a surface of the supporter 18 which is brought into contact with the human body. In this manner, the heat from the components 20 of the portable computer 12, the heat absorbers 26, and from the heat pipes 28 is not uncomfortable to a user, nor is the portable computer 12 warmed by beat from the user. It is particularly preferred that the heat insulator 30 is composed of a foam material such as a polystyrene foam or a polypropylene foam. A set of metal connectors 32 are provided on both ends of the supporter 18 to fasten the holder 10 around the waist of the human body in a length-adjustable manner.

The coil-shaped heat pipes 28 provided on the other surface of the supporter 18 are susceptible to an external force, and are therefore preferably covered with protectors 34. The protectors 34 are preferably formed of a highly heat conductive material so as to promote the radiation of heat from the heat pipes 28.

When the portable computer 12 is to be used, the computer holder 10 having the construction described above is fastened around the waist of the human body, and the computer 12 is attached to the fixture 14 of the holder 10. When the computer 12 is operated, the heat-generating components 20, such as the CPU, generate heat. The heat is transferred from the components 20 to the heat absorbers 26 through the heat conductors 22, and then efficiently released through the heat pipes 28 to the outside. In this case, no power source is required to cool the portable computer 12.

A first embodiment of the computer holder according to the present invention has been described above. However, the invention is not limited to the above embodiment. In the following alternative embodiments, the same reference characters denote the same components discussed above, and therefore no explanation will be provided.

Second Embodiment

Figure 4:
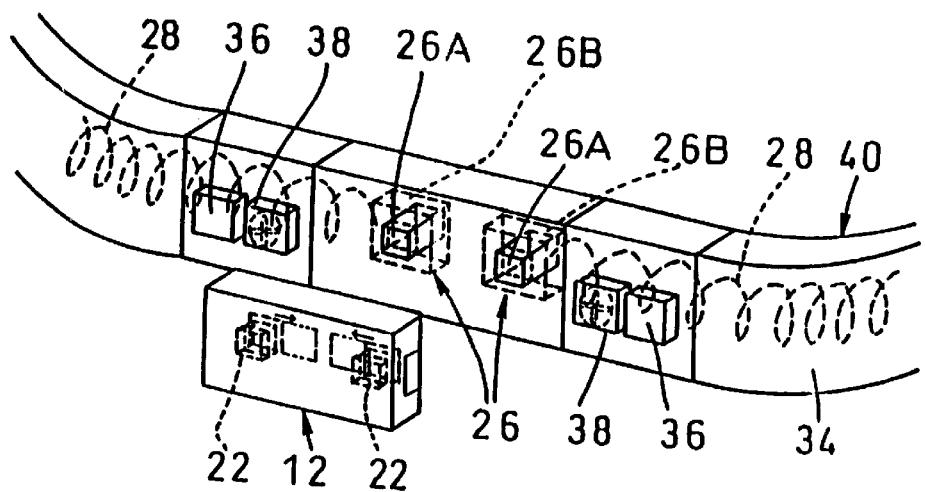
FIG. 4 is a perspective view illustrating major portions of a computer holder according to a second embodiment of the present invention.
Figure 5:
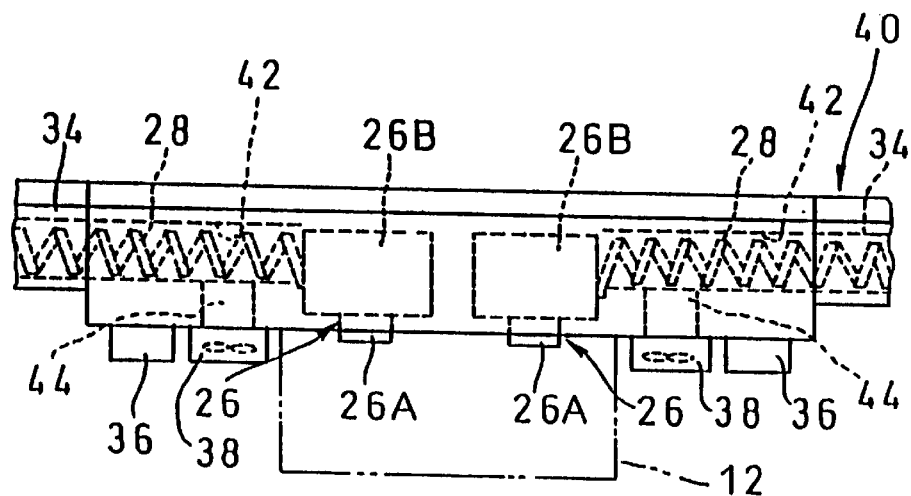
FIG. 5 is a plan view illustrating major portions of the computer holder shown in FIG. 4.
Figure 5:
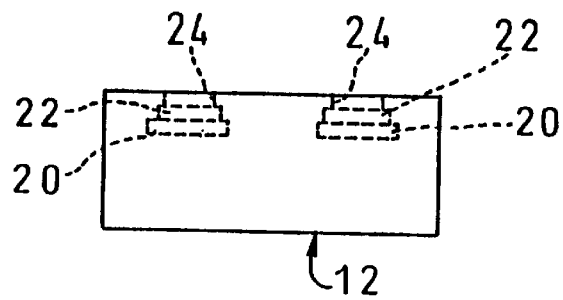

In the case where heat-generating components 20, such as the CPU, used in the portable computer 12 generate excess heat, sufficient cooling may not be provided by the conduction of the heat pipes 28 alone. In this case, as shown in FIGS. 4 and 5, fan motors 38 energized by batteries 36 may be provided. More specifically, the heat pipes 28 are each provided in a ventilation duct 42 formed in a protector 34 of a supporter 40, and the ventilation duct 42 is connected to the fan motor 38 in a hole 44. Thus, the heat pipe 28 is forcibly cooled by the feeding of gas (e.g., air or the like, but for exemplary description purposes, air will be used as the gas, as described below) into the ventilation duct 42 by the fan motor 38 and outputting the air from the other end of the duct or by sucking air from the ventilation duct 42 by the fan motor 38 and introducing air therein from the other end of the duct.

With this arrangement, even a component 20 having high heat generation (e.g., an electronic component such as a high performance CPU) can be used in the portable computer 12 without limitation. Further, the batteries 36 for energizing the fan motors 38 are provided separately from the portable computer 12, without affecting an operation period of the computer 12.

Third Embodiment

Figure 6:
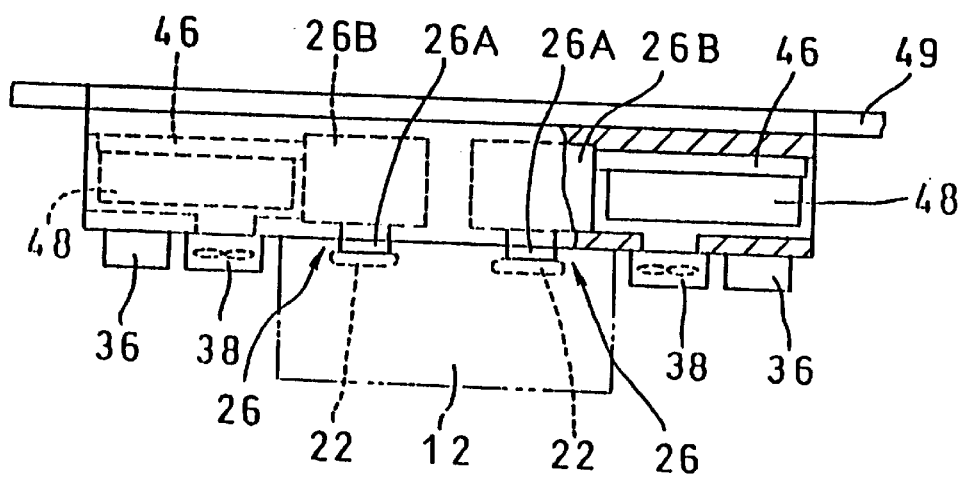
FIG. 6 is a plan view illustrating major portions of a computer holder according to a third embodiment of the present invention.

In addition to the circular cross section described above, the heat pipes may be configured in any cross section. For example, planar heat pipes 46 may be provided, as shown in FIG. 6, with a plurality of fins 48 projecting upright from surfaces thereof. As in the second embodiment, fan motors 38 energized by batteries 36 are provided. Thus, the heat pipes 46 are efficiently cooled by applying an air blow or an air suction (or a combination thereof) using fan motors 38. The planar heat pipes 46 are not required to have a unitary construction (e.g., single piece), but each may comprise a plurality of belt-shaped heat pipes provided in juxtaposition. The number of heat pipes required may be determined by considering of the amount of heat generated by the components 20.

In this arrangement, the length of the heat pipes 46 and the weight of a holder 49 can be reduced, thus assuring easy handling. When the heat generated by the components 20 is relatively low and the fins 48 have sufficiently high strength, the fins 48 may be exposed to the outside air to allow them to be cooled.

Although, in the above embodiments, one end of the heat pipe is kept in contact with the heat absorber 26, the heat conductor 22 provided in the portable computer 12 may be adapted to be brought into direct contact with the one end of the heat pipe. In this case, cooling efficiency can be further improved.

Fourth Embodiment

Figure 7:
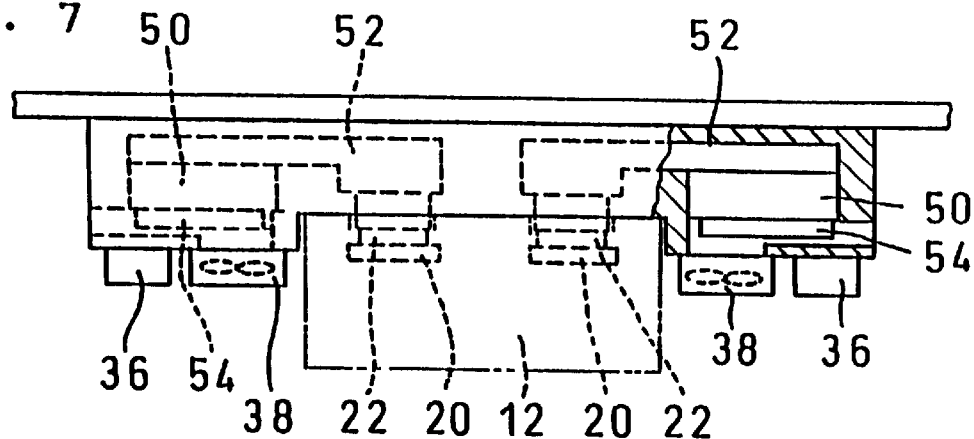
FIG. 7 is a plan view illustrating major portions of a computer holder according to a fourth embodiment of the present invention.

As shown in FIG. 7, thermomodule devices such as Peltier devices 50 can be used. In thermomodule devices, one end serves as a heat absorbing portion and the other end serves as a heat radiating portion when a voltage is applied thereto. For example, the heat absorbing portion (e.g., low temperature side) of the Peltier device 50 is kept in contact with a laterally extended portion of a heat absorber 52, while the heat radiating portion (e.g., high temperature side) of the Peltier device 50 is located to face outwardly. The heat radiating portion (e.g., high temperature side) of the Peltier device 50 may be exposed to the outside air to allow cooling thereto.

Alternatively, fan motors 38 energized by batteries 36 may be provided, so that the Peltier devices 50 can be efficiently cooled by applying an air blow or an air suction. In this case, fins 54 are preferably provided on the heat radiating portion (e.g., high temperature side) of the Peltier devices 50 to improve the cooling efficiency.

Fifth Embodiment

Figure 8A:
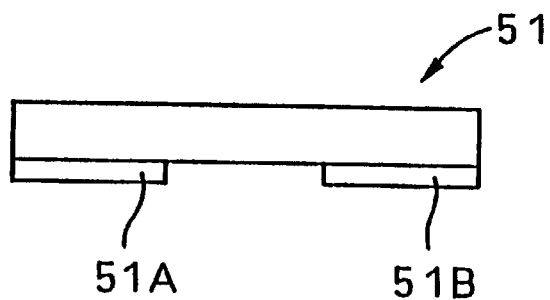
FIG. 8(a) is a plan view illustrating construction of a Peltier device.
Figure 8B:
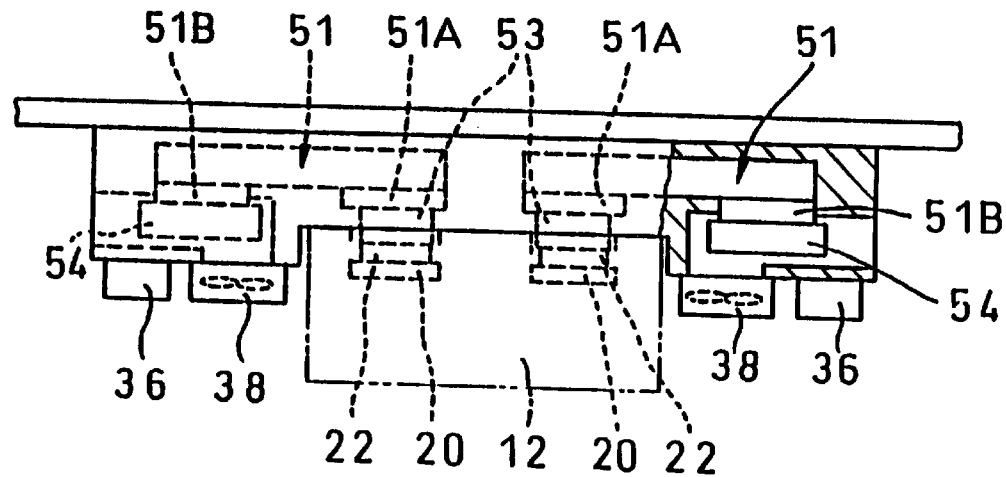
FIG. 8(b) illustrates major portions of the computer holder according to a fifth embodiment of the present invention.

As shown in FIG. 8(a), Peltier devices 51 each having a heat absorbing portion (e.g., low temperature side) 51A and a heat radiating portion (e.g., high temperature side) 51B may be disposed as a pair in the same plane. In this case, the heat absorbing portion 51A of the Peltier device 51 is kept in contact with a heat absorber 53, while the heat radiating portion 51B of the Peltier device 51 is exposed to the outside air to allow the devices to be cooled thereto, as shown in FIG. 8(b).

Thus, the component 20 can be cooled directly through the heat absorber 53, with an improved cooling response. Alternatively, as in the above second through fourth embodiments, motor fans 38 energized by batteries 36 may be provided, so that the Peltier devices 51 can efficiently be cooled by applying an air blow or an air suction. In this case, fins 54 are preferably provided on the heat radiating portion (e.g., high temperature side) 51B of the Peltier device 51 to improve the cooling efficiency.

In the embodiments above, a portable computer cooling method includes transferring beat from the heat-generating components disposed within the portable computer to the holder and dissipating the transferred heat to the atmosphere. Alternatively, the cooling of the heat-generating generating components may be achieved by applying an air blow or an air suction to the components disposed within the portable computer from the holder.

Sixth Embodiment

Figure 9:
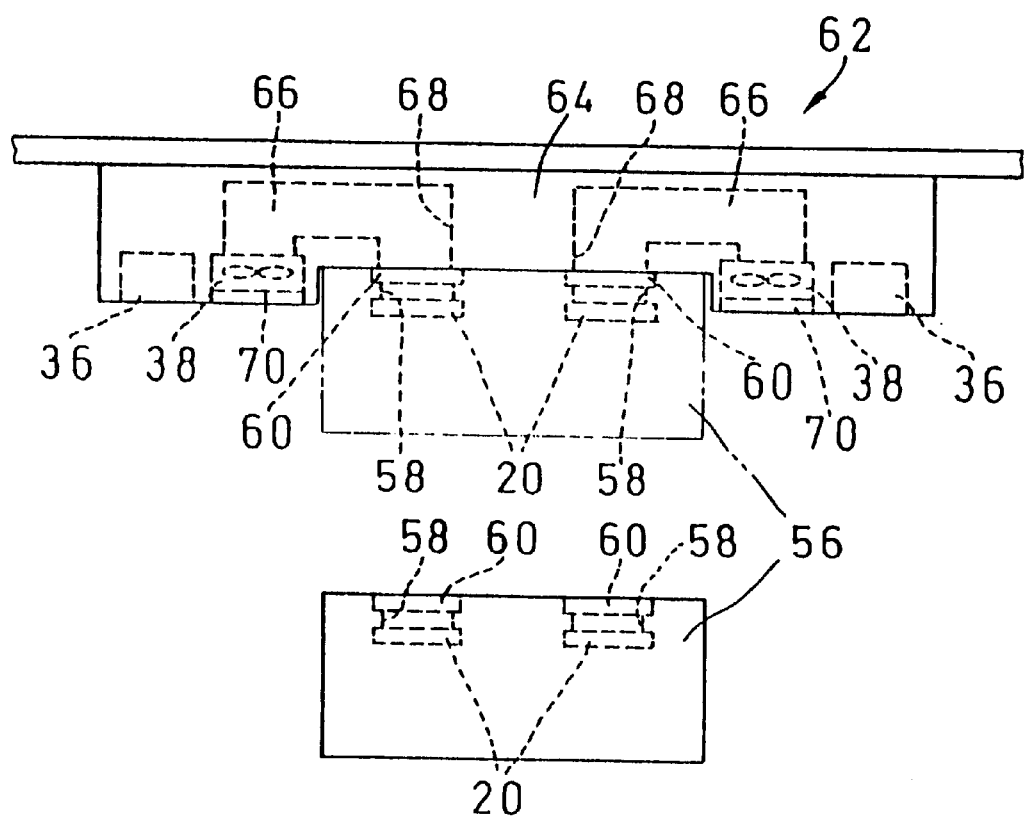
FIG. 9 is a plan view illustrating major portions of the computer holder according to a sixth embodiment of the present invention.

As shown in FIG. 9, a portable computer 56 has openings 58 formed to expose the heat-generating components and filters 60 fitted respectively in the ends of the openings 58. In a computer holder 62, fan motors 38 energized by batteries 36 are provided in a fixture 64, and openings 68 of ventilation ducts 66, through which air streams are introduced by applying an air blow or an air suction from the fan motors 38, are formed in positions corresponding to the openings 58 of the portable computer 56. A filter 70 is also provided. In this embodiment, the components are cooled directly with air streams applied by an air blow or an air suction from the fan motors 38.

One ordinarily skilled in the art will understand that the present invention is not limited to only those embodiments shown in the drawings. For example, a cooler which includes a sealed tube, made of metal or the like, and a coolant fluid contained within, may be employed instead of the heat pipe. A liquid such as water or alcohol can be used as the coolant. The cooler is constructed such that the coolant is convectively circulated in the sealed tube as the result of a temperature difference, thereby reducing the temperature of the heat absorber in contact with the cooler. The utilization of the natural convective circulation requires no electric energy.

Alternatively, the cooler may include a sealed pipe formed by connecting opposite ends of a pipe, and a pump for circulating a coolant within the sealed pipe. The utilization of a forced circulation method improves cooling efficiency.

Preferably, the holder further includes a sensor for sensing the temperature of the heat-generating components of the portable computer, and a controller for controlling the heat release using the fan motors and the Peltier devices in response to the temperature sensed by the sensor. The power consumption of the fan motors and the thermomodule devices, such as the Peltier devices, are high. However, battery consumption can be minimized in the arrangement above. The batteries may be of any type, but rechargeable batteries are particularly preferred.

The supporter for supporting the portable computer is not limited to the above-mentioned belt-shaped configuration. For example, a strapshaped supporter or article of clothing, such as a vest, may be employed as a supporter. It is also possible to use a shoulder bag or a rucksack as the supporter. The computer holder may include a spare battery or an auxiliary battery for the portable computer so that usage time can be extended. The computer holder is preferably provided with a pocket for accommodating therein a microphone and an earphone.

In an embodiment in which the computer holder is fastened to the user, preferably the heat transferred from the heat-releasing devices to the human body is dispersed to prevent heat concentration on a single portion of the body. This will prevent the holder from causing discomfort to the user because of the heat. When a single heat-generating component is provided in the portable computer, a single heat-releasing device may correspondingly be provided in the holder or, alternatively, the heat-releasing device can be divided into two parts for distribution of the exhaust heat.

In an embodiment in which a plurality of heat-generating components are provided in the portable computer, a plurality of heat-releasing devices may correspondingly be provided in the holder or, alternatively, a single heat-releasing device may be provided in the holder for releasing heat from the plurality of components which are disposed together in a single position within the computer. In this manner, various modifications, alterations and changes may be made to the embodiments on the basis of knowledge of those skilled in the art without departing from the scope of the present invention.

In accordance with the portable computer cooling method and computer holder of the present invention, the portable computer provided with no internal cooler is attached to the computer holder and the portable computer is cooled by a heat-releasing device provided in the computer holder, when the computer is in ordinary use. The capacity of the heat-releasing device can properly be determined irrespective of the housing size of the portable computer. Without any limitations to the selection of a CPU or a similar heat-generating component used in a portable computer, a component of the highest processing speed can be employed to improve the performance of the portable computer.

Further, the heat-generating component such as the CPU can be cooled by the heat-releasing device provided in the computer holder as an external device without using the battery power of the portable computer. Therefore, the continuous operation period of the portable computer is not affected.

In addition, heat which may affect the user can be dispersed by providing the heat-releasing device having a band shape or a planar shape in the computer holder. Further, heat which may affect the user can virtually be insulated from the user's body by providing the heat insulator on a side of the computer holder which is brought into contact with the user. Therefore, the computer holder does not cause any discomfort to the user.

While the invention has been described in terms of preferred embodiments, those skilled in the art will recognize that the invention can be practiced with modification within the spirit and scope of the appended claims.

What is claimed is:

1. A portable computer cooling method, comprising:

attaching a portable computer to a holder;

transferring heat of a heat-generating component disposed within the portable computer to the holder; and releasing the transferred heat to the atmosphere, wherein the holder and the portable computer are wearable, by a user, while releasing said transferred heat.

2. The portable computer cooling method, as claimed in claim 1, further comprising:

cooling said heat-generating component disposed within the portable computer by applying movement of a fluid substance to the heat-generating component.

3. A portable computer cooling method comprising:

attaching a portable computer to a holder; and cooling a heat-generating component disposed within the portable computer by applying gas movement to the heat-generating component from the holder, wherein the holder and the portable computer are wearable, by a user, while cooling said heat-generating component.

4. The portable computer cooling method according to claim 3, wherein said gas movement comprises at least one of applying a gas blow and a gas suction to said heat-generating component.

5. A computer holder comprising:

a fixture for detachably fixing a portable computer to the holder;

a heat release device for externally releasing heat of a heat-generating component disposed within the portable computer; and a supporter which supports the fixture and the heat release devices, wherein the supporter comprises one of a belt, a strap, clothes, a shoulder bag, and a rucksack.

6. The computer holder according to claim 5, wherein the heat release device comprises a heat absorber contacting a heat conductor provided within the portable computer for transferring the heat of the heat-generating component to the outside and absorbing the heat transferred through the heat conductor.

7. The computer holder according to claim 6, wherein the heat release device further comprises a heat pipe, and the heat absorber contacts one end of the heat pipe.

8. The computer holder according to claim 6, wherein the heat release device further comprises a cooler which includes a tube through which a coolant is circulated, and wherein the heat absorber is kept in contact with part of the cooler.

9. The computer holder according to claim 6, wherein the heat release device further comprises a gas blower for applying a gas movement to the heat absorber to release heat of the beat absorber to the outside, and wherein said gas movement comprises at least one of a gas blow and a gas suction.

10. The computer holder according to claim 6, wherein the heat release device further comprises a thermomodule device with a heat absorbing side contacting the heat absorber.

11. The computer holder according to claim 5, wherein the heat release device comprises a gas blower for applying a gas movement to release the heat of the heat-generating component to the outside, and wherein said gas movement comprises at least one of a gas blow and a gas suction.

12. The computer holder according to claim 5, wherein the supporter comprises a heat insulator provided on a surface opposite from a side on which the portable computer is fixed.

13. A computer holder comprising:

a fixture for detachably fixing a portable computer to the holder;

a heat-releasing means for externally releasing heat of a heat-generating component disposed within the portable computer; and a supporter which supports the fixture and the heat-releasing means, wherein the holder, the portable computer, the fixture, and the heat-releasing means are wearable, by a user, while releasing said heat.

14. The computer holder according to claim 13, wherein the heat-releasing means comprises a heat absorber contacting a heat conductor provided within the portable computer for transferring the heat of the heat-generating component to the outside and absorbing the heat transferred through the heat conductor.

15. The computer holder according to claim 14, wherein the heat-releasing means further comprises a heat pipe, and the heat absorber contacts one end of the heat pipe.

16. The computer holder according to claim 14, wherein the heat-releasing means further comprises a cooler which includes a tube through which a coolant is circulated, and wherein the heat absorber is kept in contact with part of the cooler.

17. The computer holder according to claim 14, wherein the heat-releasing means further comprises a gas blower for applying a gas movement to the heat absorber to release heat of the heat absorber to the outside, and wherein said gas movement comprises at least one of a gas blow and a gas suction.

18. The computer holder according to claim 14, wherein the heat-releasing means further comprises a thermomodule device with a heat absorbing side contacting the heat absorber.

19. The computer holder according to claim 13, wherein the heat-releasing means comprises a gas blower for applying a gas movement to release the heat of the be heat-generating component to the outside, and wherein said gas movement comprises at least one of a gas blow and a gas suction.

20. A computer holder comprising:

a fixture for detachably fixing a portable computer to the holder;

a heat release device for externally releasing heat of a heat-generating component disposed within the portable computer; and a supporter which supports the fixture and the heat release device, wherein said supporter, said fixture and said heat release device are wearable by a user.

* * * * *